US012637995B2

(12) United States Patent　　　　(10) Patent No.:　US 12,637,995 B2
Hill et al.　　　　　　　　　　　　　(45) Date of Patent:　　May 26, 2026

(54) INTEGRATED GEAR MOTOR (IGM)

(71) Applicant: Rolls-Royce Corporation, Indianapolis, IN (US)

(72) Inventors: Mathew G. Hill, Indianapolis, IN (US); Muhammed Emin Ozdemir, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/467,264

(22) Filed: Sep. 14, 2023

(65) Prior Publication Data

US 2025/0092850 A1　　　Mar. 20, 2025

(51) Int. Cl.
*F16H 3/62*　　　　　(2006.01)
*F02C 7/268*　　　　(2006.01)
(Continued)

(52) U.S. Cl.
CPC ............ *F02N 15/046* (2013.01); *F02C 7/268* (2013.01); *F02N 11/04* (2013.01); *F05D 2220/32* (2013.01); *F05D 2260/40311* (2013.01)

(58) Field of Classification Search
CPC ........ F16H 2200/2007–201; F16H 2200/2097; F16H 2200/2033; F16H 3/72–728;
(Continued)

(56) References Cited

U.S. PATENT DOCUMENTS

| 4,530,331 A | 7/1985 | Gibson et al. |
| 4,918,344 A | 4/1990 | Chikamori et al. |
| (Continued) | | |

FOREIGN PATENT DOCUMENTS

| CN | 104079116 A | 10/2014 |
| DE | 3826142 C2 | 7/1998 |
| (Continued) | | |

OTHER PUBLICATIONS

Extended Search Report from counterpart European Application No. 23202815.9 dated Mar. 21, 2024, 11 pp.
(Continued)

*Primary Examiner* — Ernesto A Suarez
*Assistant Examiner* — Lillian T Nguyen
(74) *Attorney, Agent, or Firm* — Shumaker & Sieffert, P.A.

(57) ABSTRACT

An example machine-gear system that connects to a prime mover in which the prime mover may operate at a first rotational speed and the machine may operate at a different rotational speed. The gear system, of the machine-gear system, may be configured to connect the prime mover and the machine such that the prime mover operates at the first rotational speed and the machine may operate at the different speed. The gear system may be located within the housing of the machine, which may result in a more compact machine-gear system, than for other arrangements. In some examples, the gear system may include two or more stages. In some examples, the multiple stage gear systems may be configured to engage or disengage from one, or more, stages, which may result in a machine-gear system that operates at two or more different rotational speeds as the operational modes change.

2 Claims, 5 Drawing Sheets

(51) Int. Cl.
      *F02N 11/04*        (2006.01)
      *F02N 15/04*        (2006.01)
(58) Field of Classification Search
      CPC .. F02N 15/00–046; F02N 11/00–11/14; H02K
      7/116
      See application file for complete search history.

(56)               References Cited

U.S. PATENT DOCUMENTS

| | | | |
|---|---|---|---|
| 6,500,087 B2 | 12/2002 | Klinger et al. | |
| 10,591,025 B2 | 3/2020 | Fliearman et al. | |
| 11,441,653 B1* | 9/2022 | Devreese | B60K 1/00 |
| 2006/0244317 A1* | 11/2006 | Kramer | B60L 50/16 |
| | | | 310/20 |
| 2007/0049440 A1* | 3/2007 | Raghavan | F16H 3/728 |
| | | | 475/5 |
| 2014/0194238 A1* | 7/2014 | Ono | B60K 6/445 |
| | | | 475/5 |
| 2015/0011347 A1* | 1/2015 | Takahashi | B60W 10/08 |
| | | | 475/151 |
| 2017/0106851 A1* | 4/2017 | Iwase | B60W 20/40 |
| 2022/0009332 A1* | 1/2022 | Beck | B60K 6/44 |
| 2022/0212528 A1* | 7/2022 | Corn | H02K 7/08 |
| 2022/0282788 A1 | 9/2022 | Kwon | |
| 2022/0364634 A1* | 11/2022 | Reisch | B60K 1/00 |

FOREIGN PATENT DOCUMENTS

| | | | | |
|---|---|---|---|---|
| DE | 102020203774 A1 * | 9/2021 | | |
| DE | 102020125975 A1 * | 4/2022 | | |

OTHER PUBLICATIONS

Response to Extended Search Report dated Mar. 21, 2025, from counterpart European Application No. 23202815.9 filed Aug. 15, 2025, 11 pp.

* cited by examiner

HOUSING 310

INPUT/OUTPUT SHAFT 318

MAGNETS 305

DRUM ROTOR 316

WINDINGS 308

SECOND PLANET GEAR 324

FIRST PLANET GEAR 322

DRIVING ELEMENT 334

SUN GEAR B 325

SECOND STAGE 332

RING GEAR 315

SUN GEAR A 320

FIRST STAGE 330

300

INPUT/OUTPT
SHAFT
<u>418</u>

IGM
404

PRIME MOVER
<u>402</u>

SELECTIVELY ENGAGE A FIRST STAGE TO A SECOND STAGE OF AN INTEGRATED GEAR MACHINE, DURING A FIRST OPERATING MODE — 90

SELECTIVELY DISENGAGING THE FIRST STAGE FROM THE SECOND STAGE DURING THE SECOND OPERATING MODE — 92

OPERATE THE ELECTRIC MACHINE IN EITHER THE FIRST OPERATING MODE OR THE SECOND OPERATING MODE — 94

INTEGRATED GEAR MOTOR (IGM)

TECHNICAL FIELD

The disclosure relates mechanical power transmission gear systems.

BACKGROUND

Epicyclical gear systems may be used in rotating machinery to transfer energy from one component, such as a rotatable shaft, to another. By altering certain variables such as the number, size, and teeth of the gears, an epicyclical gear system may be designed to transfer energy between components at a desired ratio and often convert a high-speed, low-torque input to a lower-speed, higher-torque output. Epicyclical gear systems may be suitable for a wide range of applications, including the transfer of energy to or from a turbine shaft or auxiliary gear box of a turbine engine. Examples of transfer of energy to a turbine shaft may include a starter motor. Examples of receiving energy from a turbine shaft may include a generator, such as an auxiliary power unit (APU).

SUMMARY

In general, the disclosure describes a machine-gear system configured to connect to a prime mover. The gear system, of the machine-gear system, may be configured to connect the prime mover and the machine such that the prime mover operates at the first rotational speed and the machine may operate at a second, different, rotational speed. Some examples of prime may include gas turbine engines, internal combustion engines, an electric motor, such as part of a diesel-electric engine, steam powered turbines and other similar prime movers. Some examples of prime movers may also be referred to as propulsors in this disclosure. Some examples of machine-gear systems may include a starter motor, a generator, an alternator, a barring motor, combination systems such as a starter/generator, as well as other similar machine-gear systems.

In some examples, the gear system may be located within the housing of the machine, which may result in a more compact machine-gear system. For instance, locating at least some of the gear system within the housing of the machine may reduce a total volume required for the gear system and the machine. In some examples, the gear system may include two or more stages. In some examples, the multiple stage gear systems may be configured to engage or disengage from one, or more, stages, which may result in a machine-gear system that operates at two or more different rotational speeds as the operational modes change.

In one example, this disclosure describes a machine-gear system, the system comprising an electric machine of a gas-turbine engine, the electric machine comprising a stator and a drum rotor that is rotationally coupled to the gas-turbine engine, wherein the drum rotor comprises an open interior space; and a multi-stage epicyclic gear system comprising a first stage and a second stage, wherein the epicyclic gear system is located at least partially within the open interior space of the drum rotor; and wherein a ring gear for the epicyclic gear system is attached to the drum rotor.

In another example, this disclosure describes an epicyclic gear device comprising a first stage and a second stage, wherein the epicyclic gear device is configured to be located at least partially within an open interior space of a drum rotor for an electric machine connected to a propulsor via the drum rotor; and wherein the drum rotor comprises a ring gear for the epicyclic gear system.

In another example, this disclosure describes a method comprising selectively engaging a first stage to a second stage of an integrated gear machine during a first operating mode, wherein: the integrated gear machine comprises a multi-stage epicyclic gear assembly and an electric machine, the multi-stage epicyclic gear assembly comprises the first stage and the second stage, the electric machine comprises a drum rotor, wherein the drum rotor is rotationally coupled to a propulsor; the epicyclic gear system is located at least partially within an open interior space of a drum rotor for the electric machine, and a ring gear for the epicyclic gear system is attached to the drum rotor; selectively disengaging the first stage from the second stage during the second operating mode and operating the electric machine in either the first operating mode or the second operating mode.

In another example, this disclosure describes a method comprising positioning a multi-stage epicyclic gear assembly with an electric machine, wherein: the electric machine comprises a drum rotor, wherein the drum rotor is rotationally coupled to a propulsor; the epicyclic gear system is located at least partially within an open interior space of a drum rotor for the electric machine, and epicyclic gear system comprises a first stage and a second stage, and a ring gear for the epicyclic gear system is attached to the drum rotor; and operating the electric machine in either a first operating mode or a second operating mode.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
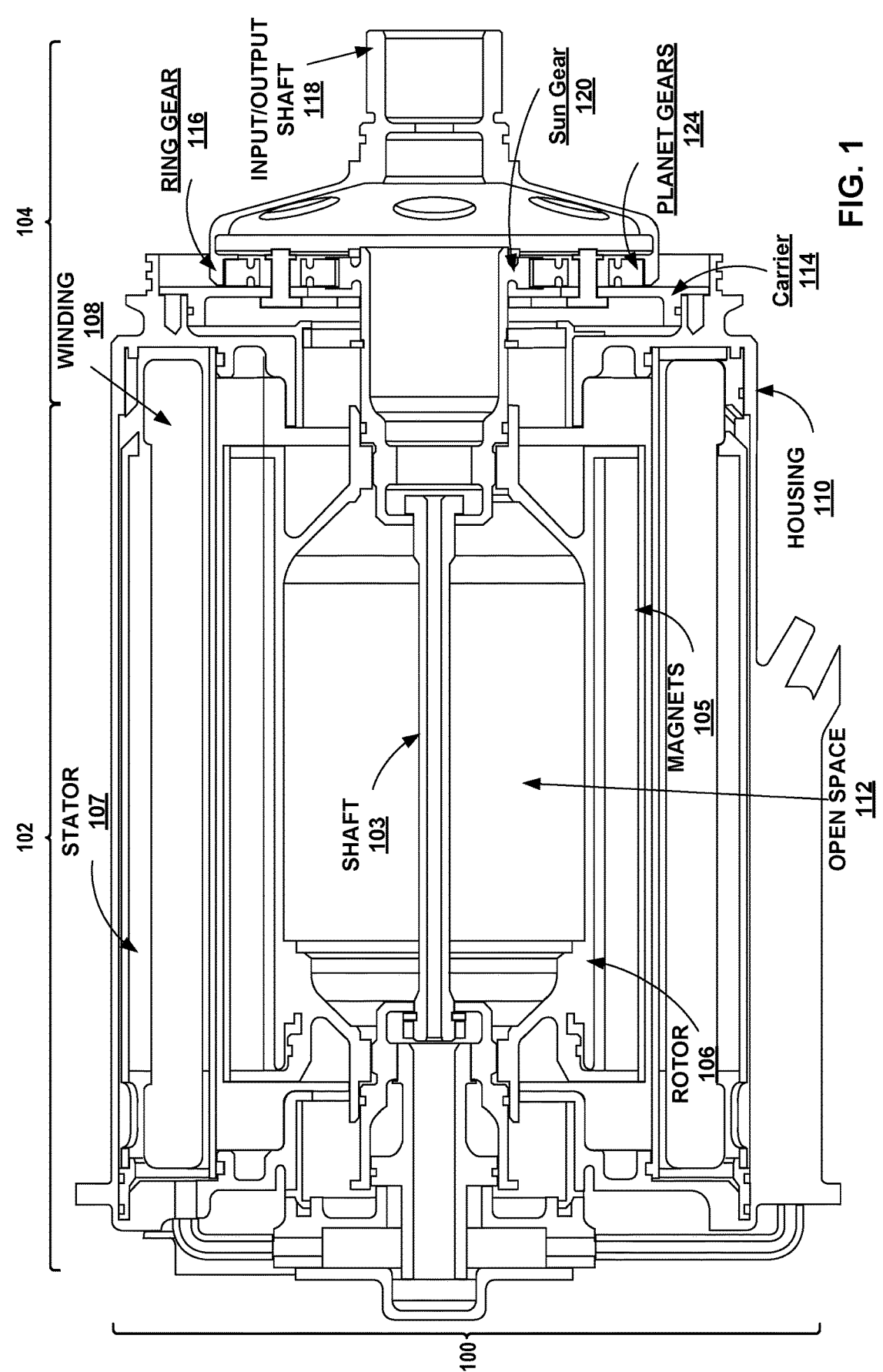
FIG. 1 is a conceptual diagram illustrating an example machine-gear system including axial stacking of epicyclic gear modules.

The disclosure describes a machine-gear system in which the gear system, of the machine-gear system, may be arranged arrangements with a machine such that the to connect to a prime mover, e.g., in some examples called a propulsor, in which the prime mover may operate at a first rotational speed, and the machine of the machine-gear system may operate at a different rotational speed. In some examples, the gear system may be located within the housing of the machine, which may result in a more compact machine-gear system, than for other arrangements. The machine-gear system may also be referred to as an integrated gear motor (IGM) or an integrated gear machine in this disclosure. In some examples, the gear system may include two or more stages. The machine-gear system of this disclosure may include any one or a combination of different arrangements. Some architectures for machine-gear systems of this disclosure may include: axial stacking of epicyclic gear modules, in-rotor epicyclic gear modules (single stage), in-rotor epicyclic gear modules (multiple stage), axial stacking of epicyclic gear module with in-rotor epicyclic geartrain and in-rotor passive shifting mechanism (single or multiple stage).

When designing an electric machine, such as for a starter-generator or prime mover application, operating requirements may limit or constrain the machine design to operate in a way that may less desirable. For example, a generator unit may be forced to spin at a speed corresponding to a power take off (PTO) speed of a gearbox for the prime mover. However, that speed may not be optimal for machine performance, power density, and/or desired weight to power ratio. Therefore, further system level improvements to the electric machine-gear system, e.g., by modifying aspects of the system to operate at a speed, torque, or other operating characteristics different from what is controlled by any physical or functional interfaces.

In other examples, in some operational modes a prime mover may operate at a very low shaft speed, which may not be ideal for the prime mover unit. Introducing an external gearbox to accommodate the operating requirements may force an undesirable geometry for structures or aerodynamics. In the example of a barring application (e.g., where one or more shafts of a prime mover, e.g., a gas-turbine engine, are slowly rotated before or after operation of the gas-turbine engine), a direct drive machine may operate at a very low efficiency to meet the need of the application. This very low efficiency may result in a larger battery weight required to maintain the barring functionality. A barring engine (also called barring motor) may be a small engine that forms part of the installation of a large machine and is used to turn or hold the main engine to a favorable position from which the main engine can be started.

In other examples, a machine may be used for various functions, at various rotational speed points as the operational modes change. The different operating speed points may make it difficult to optimize the machine for all functions. In the example of a starter/generator machine, the desired rotational speed for the starter operational mode may be different from the desired rotational speed for the generator operational mode. In some examples, the starter/generator may be attached to a shaft connected to the prime mover that operates at a speed, during some prime mover operational modes, for which the generator cannot be safely operated without risk of failure. For example, a gas-turbine prime mover in an aircraft during the take-off and climb operational modes may operate at a high rotational speed compared to a lower rotational speed during descent and landing. In this situation, it may be desirable to speed down the input driving the generator. In some examples, a gear system with two or more stages in which the gear system is configured to switch between stages, depending on the operational mode, may be useful for applications like a starter/generator application. In addition, the compact size of the IGM of this disclosure may be useful for applications where weight, center of gravity and space are considerations.

FIG. 1 is a conceptual diagram illustrating an example machine-gear system including axial stacking of epicyclic gear modules. The example of system 100 in FIG. 1 may be used in combination with any other examples of this disclosure.

System 100 is a machine-gear system that includes a machine portion 102 and an axially stacked epicyclic gear module 104. Epicyclic gear module 104 may also be referred to as an epicyclic gear system, or an epicyclic gear assembly in this disclosure. In the example of FIG. 1, machine portion 102 includes rotor 106 with magnets 105, stator 107, windings 108, housing 110, carrier 114 and open space 112.

Epicyclic gear module 104 includes input shaft 118, ring 116, sun gear 120 and planet gears 122 and 124. Input shaft 118 may receive rotational energy from or deliver rotational energy and torque to an external machine, such as an auxiliary gear box (AGB) for a turbine, or for some other external machine. As with any epicyclic gear system, additional planetary gears (not shown in FIG. 1) may surround sun gear 120.

An axial stacking of epicyclic gear modules may include of one or more gearsets being stacked axially on either end of a driving rotor. In this case the one element of the gear system will be fixed, and axial stacking of systems will result in a reduction that is proportional to the reduction of each unit multiplied by each other. Though the example, of FIG. 1 illustrates only a single stage axially stacked gear system, in other examples, epicyclic gear module 104 may include two or more stages. Also, in other examples, one or more internal gear modules may be located within open space 112 (not shown in FIG. 1) and operate along with epicyclic gear module 104. In some examples, the gear modules may operate in a fixed manner, e.g., each gear module stage remains engaged with the other gear module stages throughout all modes of operation for the system. In other examples, one or more stages may be engaged, or disengaged as the operational modes for system 100 change.

System 100 is an example of a machine-gear system in which electrical machine 102, e.g., a motor or a generator, may be attached to any one of several different gear modules 104. Similarly, gear module 104 may be attached to any one of several different electrical machines 102. In this manner, the combination of electrical machine 102 and gear system 104 may make available different machine-gear systems that may be optimized for a particular application. For example, a system in which input shaft 118 connects to a device that normally rotates at 40,000 rpm, but electrical machine 102 operates around 20,000 rpm, gear module 104 may be set with a 2:1 gear ratio. Similarly, the gear ratio for gear module 104 may be adapted to mechanically connect an electrical machine 102 that best operates at 18,000 rpm, to operate with 40,000 rpm device.

In some examples, to adapt electrical machine 102 to a different device, e.g., one that operates at 30,000 rpm, the design process may only modify the gear module, not the motor/generator, e.g., without the need to modify the magnets and windings, which may stay mostly constant. In this manner it may be faster, easier, and less costly to modify only one of electrical machine 102 or gear module 104, rather than a complete redesign of both.

In some examples, the disclosure may have advantages over other machine-gear systems in that the disclosure describes gear system arrangements with a machine such that such that the machine design and certification may be handled separately from the gear system design and certification. In this manner a single certified electrical machine, e.g., a motor a generator, or a dual purpose motor/generator, may be attached to any one of several different certified gear systems to make available several different certified machine-gear systems that may be optimized for a particular application. To provide a new certified machine-gear system for new application, with new specifications, may result in modifying, testing, and certifying just the gear system, without the extra cost and testing time for testing and certifying the associated machine. Similarly, an updated machine may be tested without the cost associated with certifying the gear systems to be used with the updated machine.

As noted above, in some examples, the gear system may be located within the housing of the machine, which may result in a more compact machine-gear system, than for other arrangements. In some examples, the gear system may include two or more stages. In some examples, the multiple stage gear systems may be configured to engage or disengage from one, or more, stages, which may result in a machine-gear system that operates at different rotational speeds as the operational modes change. In addition, the compact design of the arrangements of this disclosure, e.g., axial stacking and in-rotor gear system, may result in a machine-gear system with a size, weight and form factor that may have advantages over other types of machine-gear systems.

Figure 2:
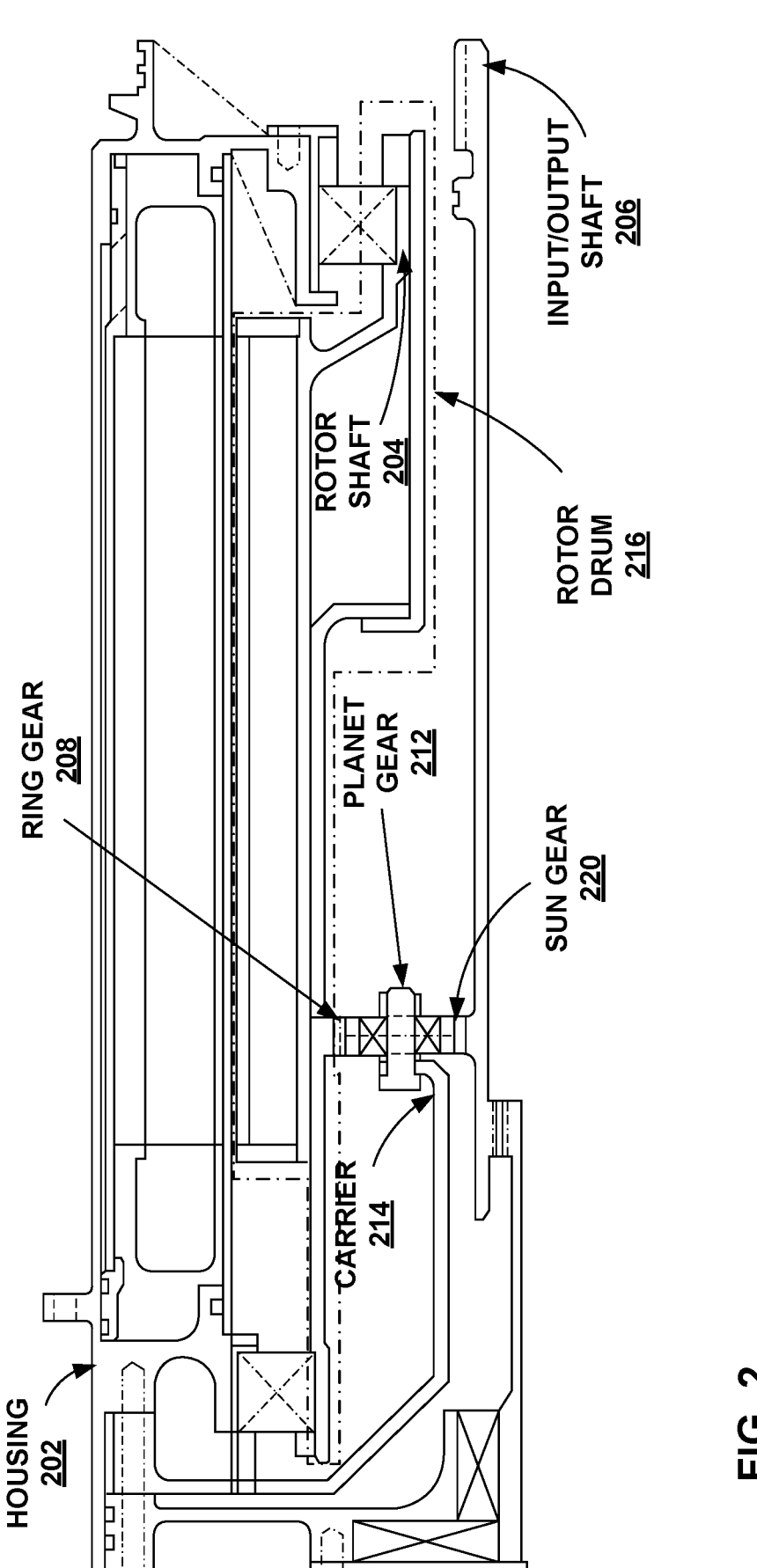
FIG. 2 is a conceptual diagram illustrating an example machine-gear system including a single stage in-rotor epicyclic gear module.

FIG. 2 is a conceptual diagram illustrating an example machine-gear system including a single stage in-rotor epicyclic gear module. An example in-rotor single stage system shown in system 200 of FIG. 2 utilizes a hollow drum rotor 216 as a ring gear in an epicyclic system. Then, the carrier 214 or the sun gear 220 could be fixed to the housing 202 to get either a speed up or speed down condition. System 200 also includes rotor shaft 206.

A benefit or advantage of this configuration of system 200 is that a gear reduction system can occupy what would be empty space within a machine architecture, e.g., open space 112 shown in FIG. 1. The result of the configuration of system 200 is a design with a better geometric characteristics, such a center of gravity (CG), overall space usage and other geometric characteristics, when compared with other configurations. The example of system 200 may also be used in combination with the axially stacked system of system 100 as a multi-stage system.

Figure 3:
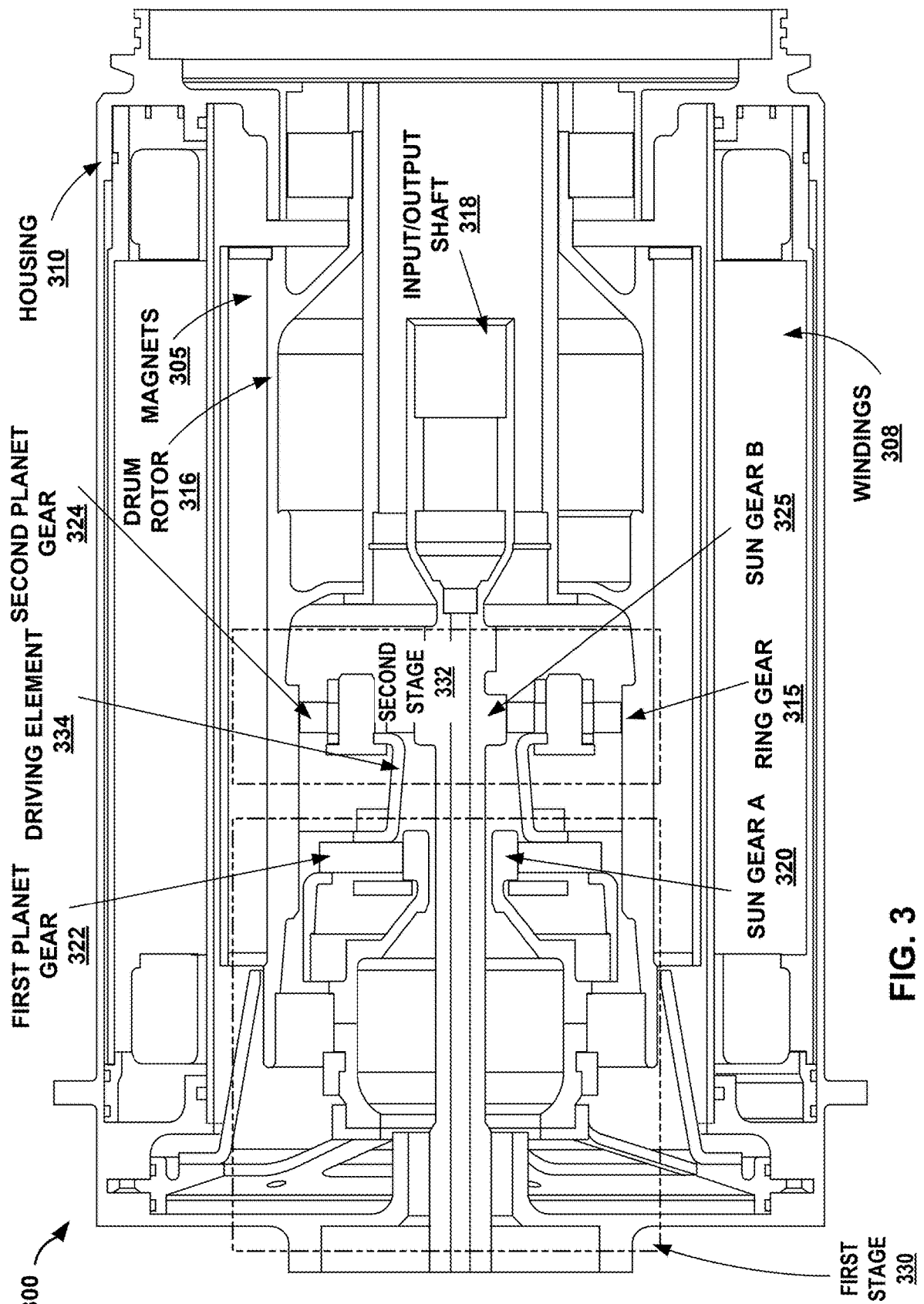
FIG. 3 is a conceptual diagram illustrating an example machine-gear system including a multiple stage in-rotor epicyclic gear module.

FIG. 3 is a conceptual diagram illustrating an example machine-gear system including a multiple stage in-rotor epicyclic gear module. Similar to the example of system 200 described above in relation to FIG. 2, the in-rotor multi-stage system of system 300 in the example of FIG. 3 utilizes hollow drum rotor 316 as one or more ring gears 315 that operate at the same shaft speed. Rotor 316 may also include one or more magnets 305. The first stage 330 in the example of FIG. 3, maintains a fixed carrier or sun gear, e.g., sun gear A 320, that the driving element 334 will drive the second stage 332 and as well as additional stages if present (not shown in FIG. 3). Second stage 332 includes driving element 334, second planet gears 324, sung gear B 325 and a carrier for the ring gears. First stage 330 and second stage 332 are located in what would be open space 112 described above in relation to FIG. 1.

As described above in relation to FIG. 1, the machine portion may include housing 310, windings 308 and other structure. For the configuration of system 300, the gear system operates like a differential and may deliver different gear ratios depending on the operational mode of system 300. For example, in an operation mode in which the machine acts a motor and a driver, then a first gear ratio can be achieved to output rotational energy, e.g., based on one of first stage 330 or on second stage 332. In a driven case, where machine-gear system 300 receives rotational energy, then a second gear ratio can be achieved based on the other stage. In other words, in some examples, during the first mode of operation a first torque direction may cause the first stage to engage with the second stage, and during the second mode of operation a second torque direction causes the first stage to disengage from the second stage. In other examples, the first torque direction may cause the first stage to engage while the second stage disengages. Similarly, the opposite torque direction, e.g., receiving rotational energy, may cause the second stage to engage while the first stage disengages. In this manner, for the example in which system 300 switches between gear stages, system 300 may carry a speed for the machine, and for the input/output shaft, in a most efficient range, e.g., an optimized speed range, for the respective component.

The configuration of system 300 may be beneficial in the case where machine-gear system 300 is a starter-generator. For example, in the starting operational mode, a higher reduction ratio may be desirable, when compared to the generating operational mode. In other examples, not shown in FIG. 3, the configuration of how these elements of system 300 are daisy chained together may be altered to get desired characteristics. For example, both first stage 330 and second stage 332 may always be engaged to achieve a desired gear ratio, instead of switching between each stage. In some examples, the carrier for one or more sets of planet gears may be attached to the housing, as described above in relation to FIG. 1. In other examples, one or more of the carriers for the planet gears may rotate relative to the housing, e.g., be attached to the input/output shaft.

Said another way, in some examples, driving element 334 may be configured to selectively engage first stage 330 to second stage 332. In such an example, first stage 330 may engage with second stage 332 during a first mode of operation, and first stage 330 may be disengaged from second stage 332 during a second mode of operation. In other examples, system 300 may be configured to selectively engage either first stage 330 or second stage 332 to input/output shaft 318, depending on the mode of operation. In some examples, system 300 may be configured to individually engage any stage of the multi-stage gear system, e.g., in the example of three or more stages. In other examples, system 300 may be configured to engage any combination of stages as desired for a selected operational mode.

In other examples, system 300 may be combined with system 100 (not shown in FIG. 3). In such a combination, the combined machine-gear system may operate, for example, in three different modes using three different ratios, or may operate in two different modes with two ratios, e.g., where any two of first stage 330, second stage 332 or the gear system of system 100 external to the machine, may be fixed and one of the stages is used for a second operational mode, e.g., as described above for the starter-generator example. In other examples, e.g., with additional stages (not shown in FIG. 3) the machine-gear system of this disclosure may operate with any combination of gear ratios in any number of operational modes.

In other examples, changing the rotational speed of system 300 may selectively engage or disengage one or more stages. For example, during a first mode of operation a first rotational speed may causes first stage 330 to engage with the second stage 332. During the second mode of operation a second rotational speed different from the first rotational speed may cause first stage 330 to disengage from second stage 332. In other examples, a change of speed may cause first stage 330 to engage while the same change of speed causes second stage 332 to disengage while first stage 330 operates.

In other examples, system 300 may include an actuating shaft that may shift the gears to switch between any of the stages for the machine-gear system, based on the desired operating mode. The actuating shaft may be operated, for example, by a hydraulic actuator, solenoid, or some other actuator, and may be manually switched by a user, automatically switched under the control of processing circuitry, or by some other signal generated by some other component of the overall system to which system 300 is attached, e.g., to a turbine engine. In some examples, input/output shaft 318 may act as the actuator.

In some examples, as described above in relation to FIG. 2, system 300 may also be combined with the axially mounted gear system of system 100, described above in relation to FIG. 1 (not shown in FIG. 3). In other words, system 100 of FIG. 1 may be considered an additional stage, in combination with stage 330 and stage 332. Any of the techniques described above for switching between gear stages may be used for the combination of system 100 and system 300.

In other examples, the multi-stage arrangement of system 300 may be fixed, and does not switch between stages, but instead, all stages operate when the machine-gear system of system 300 operates. Similarly, a combined system 100 and system 300 may also remain fixed and all stages of the multi-stage gear system may operate while the machine-gear system operates.

Figure 4:
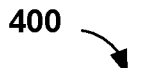
FIG. 4 is a conceptual diagram illustrating a system that includes an integrated gear motor of this disclosure connected to a prime mover, such as a propulsor.
Figure 4:
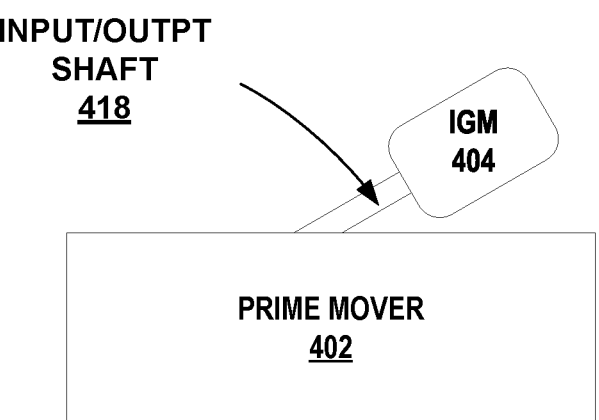

FIG. 4 is a conceptual diagram illustrating a system that includes an integrated gear motor of this disclosure connected to a prime mover, such as a propulsor. System 400 includes IGM 404 connected to prime mover 402 via input-output shaft 418. IGM 400 is an example of IGM 100, 200 and 300 described above in relation to FIGS. 1-3.

In some operational modes, IGM 404 may act as a motor to turn prime mover 402, e.g., during starting, as a barring, and similar modes by rotational energy transferred via input-output shaft 418. In other operational modes, IGM 404 may receive rotational energy from prime mover 402 via input-output shaft 418, such as when IGM 404 acts as a generator or alternator to produce electrical energy.

As described above, in some examples, a prime mover may be implemented as a combustion engine, such as a gas-turbine engine, diesel engine or other type of combustion engine.

Figure 5:
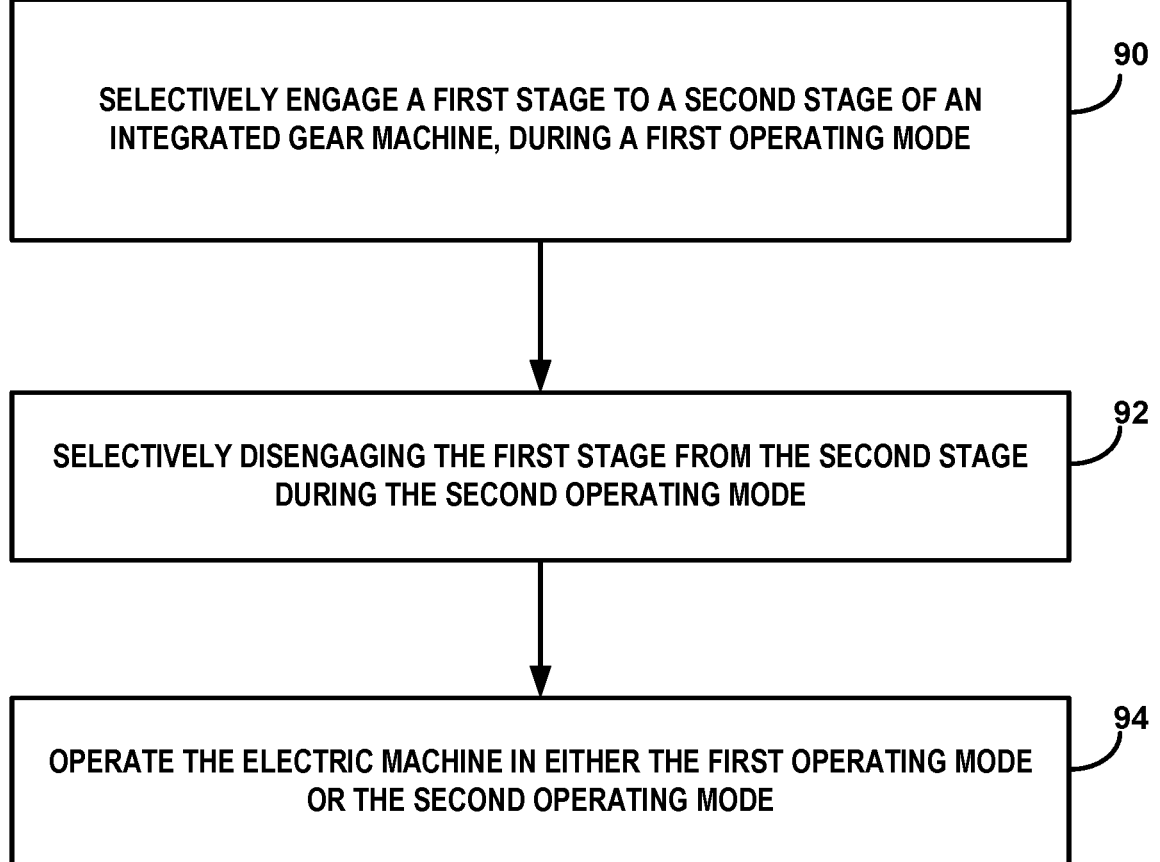
FIG. 5 is a flowchart illustrating an example assembly of the machine-gear system of this disclosure.

FIG. 5 is a flowchart illustrating an example assembly of the machine-gear system of this disclosure. The steps of FIG. 5 will be described based on the example of FIG. 3, unless otherwise noted. However, steps similar to FIG. 5 may be equally applied to any of the examples of FIGS. 1 and 2.

To assemble and use the example of FIG. 3, position the multi-stage epicyclic gear assembly with an electric machine. During operation, selectively engage a first stage to a second stage of an integrated gear machine, during a first operating mode. In the example of FIG. 3, first stage 330 and second stage 332 are located within drum rotor 316 (92). In some examples drum rotor 316 may be rotationally coupled to a prime mover (not shown in FIG. 3) such as a gas turbine engine, internal combustion engine or similar prime mover. As described above in relation to FIGS. 1 and 2, in other examples, one or more stages of the epicyclic gear system may located at least partially within an open interior space of drum rotor 316 for the electric machine and operatively coupled to one or more axially mounted stages external to drum rotor 316. In some examples one or more a ring gear, e.g., ring gear 315, for the epicyclic gear system may be attached to drum rotor 316.

The integrated gear motor of FIG. 3, in some examples may operate in a first operating mode, a second operating mode (94). In other examples, the integrated gear motor may operate in three or more operating modes. As described above, the integrated gear motor may more generally be referred to as an integrated gear machine, e.g., for machines that may act as a motor in one operational mode and a generator in another operational mode.

In some examples, as described above in relation to FIGS. 1, 2 and 3, the IGM of FIG. 3 may engage the first stage with the second stage throughout all modes of operation for the system. Similarly, in some examples all stages of the multi-stage epicyclic gear system may be engaged during all modes of operation.

In other examples, the integrated gear motor may be configured to selectively engage the first stage to the second stage, during the first mode of operation (92), and selectively disengage from the second stage during the second mode of operation (94). Similarly, some first combination of stages may be engaged with each other during one mode of operation, e.g., a generator mode in which the electric machine is driven by the prime mover. In another, different mode of operation some second combination of stages may be engaged during the other mode of operation. For example, the second combination of stages may be engaged when the integrated gear motor may act as a driver, such as a starter or barring motor.

The techniques of this disclosure may also be described in the following examples.

Example 1: A machine-gear system comprising an electric machine of a gas-turbine engine, the electric machine comprising a stator and a drum rotor that is rotationally coupled to the gas-turbine engine, wherein the drum rotor comprises an open interior space; and a multi-stage epicyclic gear system comprising a first stage and a second stage, wherein the epicyclic gear system is located at least partially within the open interior space of the drum rotor; and wherein a ring gear for the epicyclic gear system is attached to the drum rotor.

Example 2: The system of example 1, further comprising a driving element that connects the first stage to the second stage, wherein the first stage remains engaged with the second stage throughout all modes of operation for the system.

Example 3: The system of any of examples 1 and 2, further comprising a driving element; wherein the driving element is configured to selectively engage the first stage to the second stage, wherein the first stage is configured to engage with the second stage during a first mode of operation, and wherein the first stage is configured to disengage from the second stage during a second mode of operation.

Example 4: The system of example 3, wherein the system is a starter/generator, wherein the first mode of operation is a starting mode, and the first stage is configured to engage to the second stage during the starting mode, and wherein the second mode of operation is a generating mode, and the first stage is configured to disengage from the second stage during the generating mode.

Example 5: The system of any of examples 3 and 4, further comprising a shaft that outputs rotational energy from the epicyclic gear system during a first mode of operation and receives rotational energy during a second mode of operation; wherein during the first mode of operation a first torque direction causes the first stage to engage with the second stage, and wherein during the second mode of operation a second torque direction causes the first stage to disengage from the second stage.

Example 6: The system of any of examples 3 through 5, wherein, during the first mode of operation, responsive to a first rotational speed for the electrical machine the first stage is configured to engage with the second stage, and wherein, during the second mode of operation, responsive to a second rotational speed for the electrical machine different from the first rotational speed the first stage is configured to disengage from the second stage.

Example 7: The system of any of examples 3 through 6, further comprising an actuator configured to cause the first stage to engage, or to disengage from the second stage.

Example 8: The system of any of examples 1 through 7, further comprising at least one carrier for planet gears of the system, wherein the at least one carrier is mechanically fixed to a housing of the electric machine.

Example 9: The system of example 8, wherein the third stage for the epicyclic gear system is configured to be axially mounted to the system and located outside of the drum rotor.

Example 10: An epicyclic gear device comprising a first stage and a second stage, wherein the epicyclic gear device is configured to be located at least partially within an open interior space of a drum rotor for an electric machine connected to a prime mover via the drum rotor; and wherein the drum rotor comprises a ring gear for the epicyclic gear system.

Example 11: The device of example 10, further comprising a driving element that connects the first stage to the second stage, wherein the first stage remains engaged with the second stage throughout all modes of operation for the device.

Example 12: The device of any of examples 10 and 11, further comprising a driving element; wherein the driving element is configured to selectively engage the first stage to the second stage, wherein the first stage is configured to engage with the second stage during a first mode of operation, and wherein the first stage is configured to disengage from the second stage during a second mode of operation.

Example 13: The device of example 12, further comprising a shaft that outputs rotational energy from the epicyclic gear device during a first mode of operation and to receive rotational energy during a second mode of operation; wherein during the first mode of operation a first torque direction causes the first stage to engage with the second stage, and wherein during the second mode of operation a second torque direction causes the first stage to disengage from the second stage.

Example 14: The device of any of examples 12 and 13, wherein, during the first mode of operation responsive to a rotational speed for the drum rotor the first stage is configured to engage with the second stage, and wherein, during the second mode of operation responsive to a second rotational speed different from the first rotational speed the first stage is configured to disengage from the second stage.

Example 15: The device of any of examples 12 through 14, further comprising an actuator configured to cause the first stage to engage, or to disengage, from the second stage.

Example 16: The device of any of examples 10 through 15, further comprising at least one carrier for planet gears of the device, wherein the at least one carrier is mechanically fixed to a housing of the electric machine.

Example 17: A method comprising: selectively engaging a first stage to a second stage of an integrated gear machine during a first operating mode, wherein: the integrated gear machine comprises a multi-stage epicyclic gear assembly and an electric machine, the multi-stage epicyclic gear assembly comprises the first stage and the second stage, the electric machine comprises a drum rotor, wherein the drum rotor is rotationally coupled to a prime mover; the epicyclic gear system is located at least partially within an open interior space of a drum rotor for the electric machine, and a ring gear for the epicyclic gear system is attached to the drum rotor; selectively disengaging the first stage from the second stage during the second operating mode and operating the electric machine in either the first operating mode or the second operating mode.

Example 18: The method of example 17, further comprising, engaging the first stage with the second stage throughout all modes of operation for the system.

Example 19: The method of example 19, wherein the first mode of operation is a starting mode, and the first stage is configured to engage to the second stage during the starting mode, and wherein the second mode of operation is a generating mode, and the first stage is configured to disengage from the second stage during the generating mode.

Various examples of the disclosure have been described. These and other examples are within the scope of the following claims.

What is claimed is:

1. A method comprising:
selectively engaging a first stage to a second stage of an integrated gear machine during a starting mode, wherein:
the integrated gear machine comprises a multi-stage epicyclic gear assembly and an electric machine,
the multi-stage epicyclic gear assembly comprises the first stage and the second stage,
the electric machine comprises a drum rotor, wherein the drum rotor is rotationally coupled to a prime mover;
the epicyclic gear assembly is located at least partially within an open interior space of a drum rotor for the electric machine, and
a ring gear for the epicyclic gear assembly is attached to the drum rotor;
selectively disengaging the first stage from the second stage during a generating mode; and
operating the electric machine in either a first operating mode or the generating mode.

2. The method of claim 1, wherein the prime mover comprises a gas-turbine engine.

* * * * *